(12) United States Patent
Mitropolskaya et al.

(10) Patent No.: US 11,920,217 B2
(45) Date of Patent: Mar. 5, 2024

(54) HIGH-STRENGTH TITANIUM ALLOY FOR ADDITIVE MANUFACTURING

(71) Applicants: The Boeing Company, Chicago, IL (US); VSMPO-AVISMA Corporation, Verkhnyaya Salda, Sverdlovsk Region (RU)

(72) Inventors: Natalia Mitropolskaya, Moscow (RU); Robert Briggs, Auburn, WA (US); Catherine Parrish, San Jose dos Campos (BR); Arash Ghabchi, Seattle, WA (US); Matthew Crill, Mill Creek, WA (US); Michael Leder, Verkhnyaya Salda (RU); Igor Puzakov, Verkhnyaya Salda (RU); Alexey Zaitsev, Verkhnyaya Salda (RU); Natalia Tarenkova, Verkhnyaya Salda (RU)

(73) Assignees: The Boeing Company, Arlington, VA (US); VSMPO-AVISMA Corporation, Verkhnyaya Salda (RU)

( * ) Notice: Subject to any disclaimer, the term of this patent is extended or adjusted under 35 U.S.C. 154(b) by 160 days.

(21) Appl. No.: 17/262,890

(22) PCT Filed: Aug. 31, 2018

(86) PCT No.: PCT/RU2018/000577
§ 371 (c)(1),
(2) Date: Jan. 25, 2021

(87) PCT Pub. No.: WO2020/046160
PCT Pub. Date: Mar. 5, 2020

(65) Prior Publication Data
US 2021/0164074 A1 Jun. 3, 2021

(51) Int. Cl.
*C22C 14/00* (2006.01)
*B22F 9/04* (2006.01)
(Continued)

(52) U.S. Cl.
CPC .............. *C22C 14/00* (2013.01); *B22F 9/04* (2013.01); *B33Y 70/00* (2014.12); *C22F 1/183* (2013.01); *B22F 2301/205* (2013.01)

(58) Field of Classification Search
CPC ...... C22C 14/00; B22F 9/04; B22F 2301/205; B33Y 70/00; B33Y 10/00; C22F 1/183; Y02P 10/25
See application file for complete search history.

(56) References Cited

U.S. PATENT DOCUMENTS

| 5,160,554 A | 11/1992 | Bania et al. |
| 2003/0211003 A1 | 11/2003 | Kosaka et al. |

(Continued)

FOREIGN PATENT DOCUMENTS

| CN | 1653199 | 8/2005 |
| CN | 101010439 | 8/2007 |

(Continued)

OTHER PUBLICATIONS

SU555161A1 machine translation (Year: 1977).*
(Continued)

*Primary Examiner* — John A Hevey
(74) *Attorney, Agent, or Firm* — Walters & Wasylyna LLC

(57) ABSTRACT

A titanium alloy for additive manufacturing that includes 5.5 to 6.5 wt % aluminum (Al); 3.0 to 4.5 wt % vanadium (V); 1.0 to 2.0 wt % molybdenum (Mo); 0.3 to 1.5 wt % iron (Fe); 0.3 to 1.5 wt % chromium (Cr); 0.05 to 0.5 wt % zirconium (Zr); 0.2 to 0.3 wt % oxygen (O); maximum of 0.05 wt % nitrogen (N); maximum of 0.08 wt % carbon (C); maximum of 0.25 wt % silicon (Si); and balance titanium, wherein a value of an aluminum structural equivalent $[Al]_{eq}$ ranges from 7.5 to 9.5 wt %, and is defined by the following equation: $[Al]_{eq}=[Al]+[O]\times 10+[Zr]/6$, and wherein a value (Continued)

of a molybdenum structural equivalent $[Mo]_{eq}$ ranges from 6.0 to 8.5 wt %, and is defined by the following equation:

$$[Mo]_{eq}=[Mo]+[V]/1.5+[Cr]\times1.25+[Fe]\times2.5.$$

20 Claims, 8 Drawing Sheets

(51) Int. Cl.
*B33Y 70/00* (2020.01)
*C22F 1/18* (2006.01)

(56) References Cited

U.S. PATENT DOCUMENTS

| | | | |
|---|---|---|---|
| 2010/0065158 A1 | 3/2010 | Sheehan et al. | |
| 2012/0076611 A1 | 3/2012 | Bryan | |
| 2014/0061165 A1* | 3/2014 | Stempfer | B23K 9/1006 |
| | | | 219/76.16 |
| 2017/0146046 A1* | 5/2017 | Foltz, IV | C22F 1/183 |
| 2017/0216921 A1* | 8/2017 | Oswald | B22F 10/66 |
| 2017/0260607 A1* | 9/2017 | Kosaka | C22C 14/00 |
| 2017/0326868 A1 | 11/2017 | Heard et al. | |
| 2021/0310104 A1* | 10/2021 | Mitropolskaya | C21D 8/06 |

FOREIGN PATENT DOCUMENTS

| | | | | |
|---|---|---|---|---|
| CN | 102834537 | | 12/2012 | |
| CN | 106460102 | | 2/2017 | |
| EP | 2 435 591 | | 4/2012 | |
| EP | 2 527 478 | | 11/2012 | |
| EP | 3 196 321 | | 7/2017 | |
| JP | 2005-509115 | | 4/2005 | |
| JP | 2013-534964 | | 9/2013 | |
| RU | 2010 106 730 | | 8/2011 | |
| RU | 2581332 | | 4/2016 | |
| RU | 2618016 | | 5/2017 | |
| SU | 555161 | | 4/1977 | |
| SU | 555161 A1 * | 4/1977 | | C22C 14/00 |
| WO | WO 2016/140064 | | 9/2016 | |
| WO | WO 2017/156401 | | 9/2017 | |
| WO | WO-2017156401 A1 * | 9/2017 | | C22C 14/00 |

OTHER PUBLICATIONS

China National Intellectual Property Administration, Office Action, with English translation, App. No. 201880096998.6 (dated Jun. 7, 2022).

Canadian Intellectual Property Office, Office Action, App. No. 3,109,213 (dated May 12, 2022).

China National Intellectual Property Administration, Office Action, with English translation, App. No. 201880096998.6 (dated Feb. 28, 2022).

International Searching Authority: International Search Report and Written Opinion, App. No. PCT/RU2018/000577 (dated Nov. 15, 2018).

National Institute of Industrial Property (Brazil), Office Action, with English translation, App. No. BR1120210032343-6 (dated Aug. 1, 2022).

China National Intellectual Property Administration, Office Action, with English translation, App. No. 2018800969986 (dated Sep. 3, 2021).

European Patent Office, "Communication pursuant to Rules 161(1) and 162 EPC," App. No. 187860663 (dated Apr. 9, 2021).

International Searching Authority: Written Opinion and Preliminary Report on Patentability, App. No. PCT/RU2018/000577 (dated Mar. 2, 2021).

Japan Patent Office, Office Action, with English translation, App. No. 2021-510305, (dated Sep. 27, 2022).

* cited by examiner

HIGH-STRENGTH TITANIUM ALLOY FOR ADDITIVE MANUFACTURING

PRIORITY

This application is the U.S. national phase entry of Intl. App. No. PCT/RU2018/000577 filed on Aug. 31, 2018.

FIELD

This applicant relates to titanium alloys and, more particularly, to high-strength alpha-beta titanium alloys for additive manufacturing.

BACKGROUND

Titanium alloys typically exhibit high strength-to-weight ratios, excellent corrosion resistance, and high-temperature properties. Therefore, titanium alloys are commonly used in the aerospace industry, such as to manufacture various aircraft components and the like.

Titanium alloys are relatively expensive and can be difficult to machine into complex parts that meet aerospace specifications. This has led the aerospace industry to the development of net-shape (or near net-shape) technologies, including additive manufacturing processes which reduce the amount of machining required.

Ti-6Al-4V is one of the most common titanium alloys used in the aerospace industry due to its ductility and relatively high tensile and shear strengths. For many applications, the desired mechanical properties of Ti-6Al-4V are achieved in mill annealed condition. Even greater strength can be achieved when Ti-6Al-4V is in solution treated and aged (STA) condition. However, Ti-6Al-4V in solution treated and aged (STA) condition is more expensive to manufacture, and is limited to relatively small cross-sections. Furthermore, the increased strength of Ti-6Al-4V in solution treated and aged (STA) condition is often at the expense of ductility.

Accordingly, those skilled in the art continue with research and development efforts in the fields of titanium alloys and additive manufacturing.

SUMMARY

A titanium alloy that includes (e.g., consists essential of) 5.5 to 6.5 wt % aluminum (Al); 3.0 to 4.5 wt % vanadium (V); 1.0 to 2.0 wt % molybdenum (Mo); 0.3 to 1.5 wt % iron (Fe); 0.3 to 1.5 wt % chromium (Cr); 0.05 to 0.5 wt % zirconium (Zr); 0.2 to 0.3 wt % oxygen (O); maximum of 0.05 wt % nitrogen (N); maximum of 0.08 wt % carbon (C); maximum of 0.25 wt % silicon (Si); and balance titanium, wherein a value of an aluminum structural equivalent $[Al]_{eq}$ ranges from 7.5 to 9.5 wt %, and is defined by the following equation:

$$[Al]_{eq}=[Al]+[O]\times 10+[Zr]/6, \text{ and}$$

wherein a value of a molybdenum structural equivalent $[Mo]_{eq}$ ranges from 6.0 to 8.5 wt %, and is defined by the following equation:

$$[Mo]_{eq}=[Mo]+[V]/1.5+[Cr]\times 1.25+[Fe]\times 2.5.$$

A powder composition that includes (e.g., consists essential of) 5.5 to 6.5 wt % aluminum (Al); 3.0 to 4.5 wt % vanadium (V); 1.0 to 2.0 wt % molybdenum (Mo); 0.3 to 1.5 wt % iron (Fe); 0.3 to 1.5 wt % chromium (Cr); 0.05 to 0.5 wt % zirconium (Zr); 0.2 to 0.3 wt % oxygen (O); maximum of 0.05 wt % nitrogen (N); maximum of 0.08 wt % carbon (C); maximum of 0.25 wt % silicon (Si); and balance titanium, wherein a value of an aluminum structural equivalent $[Al]_{eq}$ ranges from 7.5 to 9.5 wt %, and is defined by the following equation:

$$[Al]_{eq}=[Al]+[O]\times 10+[Zr]/6, \text{ and}$$

wherein a value of a molybdenum structural equivalent $[Mo]_{eq}$ ranges from 6.0 to 8.5 wt %, and is defined by the following equation:

$$[Mo]_{eq}=[Mo]+[V]/1.5+[Cr]\times 1.25+[Fe]\times 2.5.$$

A wire that includes (e.g., consists essential of) 5.5 to 6.5 wt % aluminum (Al); 3.0 to 4.5 wt % vanadium (V); 1.0 to 2.0 wt % molybdenum (Mo); 0.3 to 1.5 wt % iron (Fe); 0.3 to 1.5 wt % chromium (Cr); 0.05 to 0.5 wt % zirconium (Zr); 0.2 to 0.3 wt % oxygen (O); maximum of 0.05 wt % nitrogen (N); maximum of 0.08 wt % carbon (C); maximum of 0.25 wt % silicon (Si); and balance titanium, wherein a value of an aluminum structural equivalent $[Al]_{eq}$ ranges from 7.5 to 9.5 wt %, and is defined by the following equation:

$$[Al]_{eq}=[Al]+[O]\times 10+[Zr]/6, \text{ and}$$

wherein a value of a molybdenum structural equivalent $[Mo]_{eq}$ ranges from 6.0 to 8.5 wt %, and is defined by the following equation:

$$[Mo]_{eq}=[Mo]+[V]/1.5+[Cr]\times 1.25+[Fe]\times 2.5.$$

A method for manufacturing an additive manufacturing feedstock includes the step of powderizing a titanium alloy composition that includes (e.g., consists essential of) 5.5 to 6.5 wt % aluminum (Al); 3.0 to 4.5 wt % vanadium (V); 1.0 to 2.0 wt % molybdenum (Mo); 0.3 to 1.5 wt % iron (Fe); 0.3 to 1.5 wt % chromium (Cr); 0.05 to 0.5 wt % zirconium (Zr); 0.2 to 0.3 wt % oxygen (O); maximum of 0.05 wt % nitrogen (N); maximum of 0.08 wt % carbon (C); maximum of 0.25 wt % silicon (Si); and balance titanium, wherein a value of an aluminum structural equivalent $[Al]_{eq}$ ranges from 7.5 to 9.5 wt %, and is defined by the following equation:

$$[Al]_{eq}=[Al]+[O]\times 10+[Zr]/6, \text{ and}$$

wherein a value of a molybdenum structural equivalent $[Mo]_{eq}$ ranges from 6.0 to 8.5 wt %, and is defined by the following equation:

$$[Mo]_{eq}=[Mo]+[V]/1.5+[Cr]\times 1.25+[Fe]\times 2.5.$$

A method for manufacturing an additive manufacturing feedstock from a metallic starting material that includes (e.g., consists essential of) 5.5 to 6.5 wt % aluminum (Al); 3.0 to 4.5 wt % vanadium (V); 1.0 to 2.0 wt % molybdenum (Mo); 0.3 to 1.5 wt % iron (Fe); 0.3 to 1.5 wt % chromium (Cr); 0.05 to 0.5 wt % zirconium (Zr); 0.2 to 0.3 wt % oxygen (O); maximum of 0.05 wt % nitrogen (N); maximum of 0.08 wt % carbon (C); maximum of 0.25 wt % silicon (Si); and balance titanium, wherein a value of an aluminum structural equivalent $[Al]_{eq}$ ranges from 7.5 to 9.5 wt %, and is defined by the following equation:

$$[Al]_{eq}=[Al]+[O]\times 10+[Zr]/6, \text{ and}$$

wherein a value of a molybdenum structural equivalent $[Mo]_{eq}$ ranges from 6.0 to 8.5 wt %, and is defined by the following equation:

$$[Mo]_{eq}=[Mo]+[V]/1.5+[Cr]\times 1.25+[Fe]\times 2.5,$$

the method includes the steps of (1) grinding the metallic starting material to yield an intermediate powder; and (2) spheroidizing the intermediate powder to yield the additive manufacturing feedstock.

A method for manufacturing an additive manufacturing feedstock that includes steps of (1) melting an ingot that includes (e.g., consists essential of) 5.5 to 6.5 wt % aluminum (Al); 3.0 to 4.5 wt % vanadium (V); 1.0 to 2.0 wt % molybdenum (Mo); 0.3 to 1.5 wt % iron (Fe); 0.3 to 1.5 wt % chromium (Cr); 0.05 to 0.5 wt % zirconium (Zr); 0.2 to 0.3 wt % oxygen (O); maximum of 0.05 wt % nitrogen (N); maximum of 0.08 wt % carbon (C); maximum of 0.25 wt % silicon (Si); and balance titanium, wherein a value of an aluminum structural equivalent $[Al]_{eq}$ ranges from 7.5 to 9.5 wt %, and is defined by the following equation:

$[Al]_{eq}=[Al]+[O]\times 10+[Zr]/6$, and wherein a value of a molybdenum structural equivalent $[Mo]_{eq}$ ranges from 6.0 to 8.5 wt %, and is defined by the following equation:

$[Mo]_{eq}=[Mo]+[V]/1.5+[Cr]\times 1.25+[Fe]\times 2.5$, (2) conversion of the ingot to a forged billet at beta and/or alpha-beta phase field temperatures; (3) machining of the forged billet; (4) hot rolling at a heating temperature of beta and/or alpha-beta phase field to produce a rolled stock; (5) annealing of the rolled stock at a temperature of 550° C. to 788° C. (1022° F. to 1450° F.) for at least 0.5 hour; (6) drawing to produce a wire with a nominal diameter of at most 3.175 mm (0.125 inches); and annealing at a temperature of 550° C. to 788° C. (1022° F. to 1450° F.) for at least 0.5 hour.

A manufacturing method comprising additively manufacturing a part from an additive manufacturing feedstock that includes (e.g., consists essential of) 5.5 to 6.5 wt % aluminum (Al); 3.0 to 4.5 wt % vanadium (V); 1.0 to 2.0 wt % molybdenum (Mo); 0.3 to 1.5 wt % iron (Fe); 0.3 to 1.5 wt % chromium (Cr); 0.05 to 0.5 wt % zirconium (Zr); 0.2 to 0.3 wt % oxygen (O); maximum of 0.05 wt % nitrogen (N); maximum of 0.08 wt % carbon (C); maximum of 0.25 wt % silicon (Si); and balance titanium, wherein a value of an aluminum structural equivalent $[Al]_{eq}$ ranges from 7.5 to 9.5 wt %, and is defined by the following equation:

$[Al]_{eq}=[Al]+[O]\times 10+[Zr]/6$, and wherein a value of a molybdenum structural equivalent $[Mo]_{eq}$ ranges from 6.0 to 8.5 wt %, and is defined by the following equation:

$[Mo]_{eq}=[Mo]+[V]/1.5+[Cr]\times 1.25+[Fe]\times 2.5$.

Other aspects of the disclosed high-strength titanium alloys for additive manufacturing and associated methods will become apparent from the following detailed description, the accompanying drawings and the appended claims.

DETAILED DESCRIPTION

Figure 1:
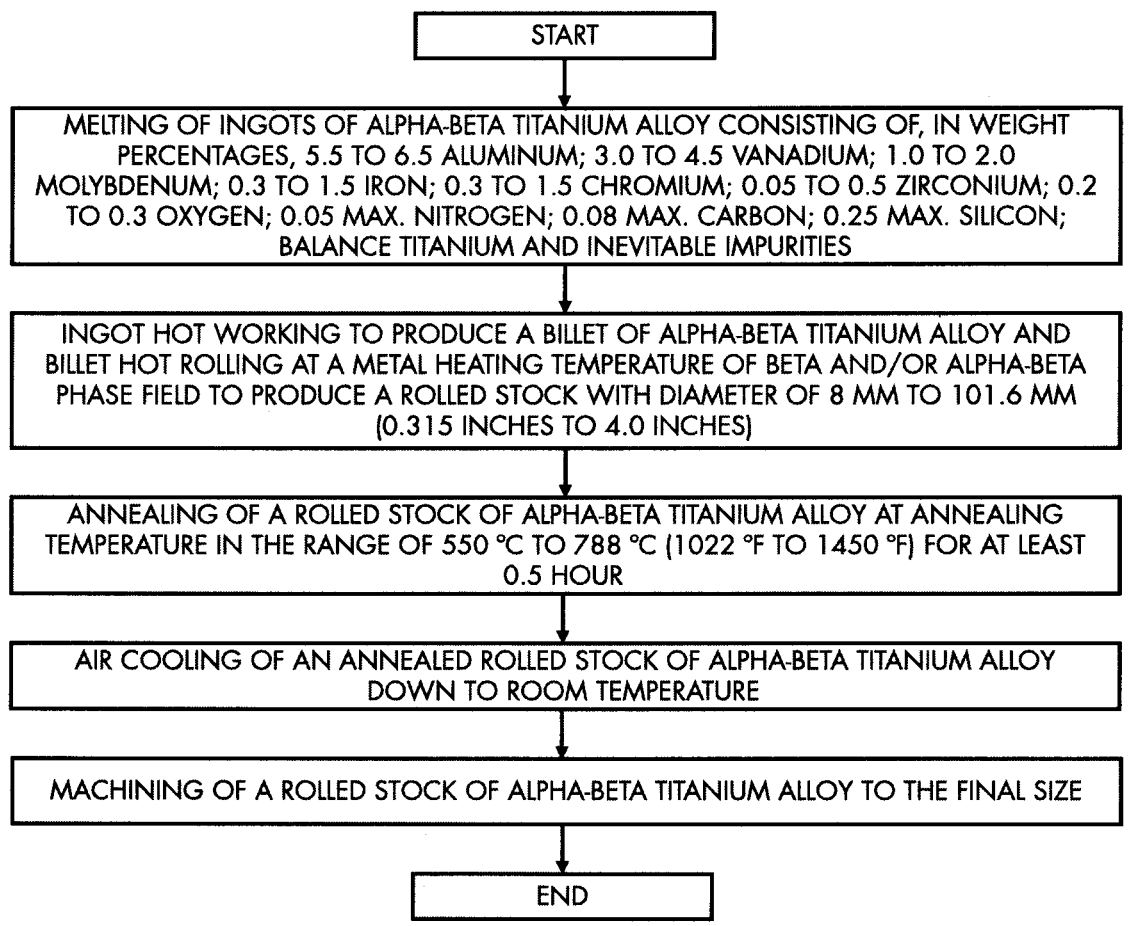
FIG. 1 is a flow diagram depicting the manufacture of a bar made of the disclosed titanium alloy.

Disclosed is a high-strength wrought titanium alloy for additive manufacturing. The disclosed titanium alloy can be prepared as an additive manufacturing feedstock, such as in powdered form or thin wire form, having chemistry effectively balanced with production capabilities and high ultimate tensile strength and double shear strength, while maintaining a high level of plastic properties in the annealed condition.

The disclosed titanium alloy includes (e.g., consists essential of) 5.5 to 6.5 wt % aluminum (Al); 3.0 to 4.5 wt % vanadium (V); 1.0 to 2.0 wt % molybdenum (Mo); 0.3 to 1.5 wt % iron (Fe); 0.3 to 1.5 wt % chromium (Cr); 0.05 to 0.5 wt % zirconium (Zr); 0.2 to 0.3 wt % oxygen (O); maximum of 0.05 wt % nitrogen (N); maximum of 0.08 wt % carbon (C); maximum of 0.25 wt % silicon (Si); inevitable impurities; and balance titanium, wherein a value of an aluminum structural equivalent $[Al]_{eq}$ ranges from 7.5 to 9.5 wt %, and is defined by the following equation:

$[Al]_{eq}=[Al]+[O]\times 10+[Zr]/6$, and wherein a value of a molybdenum structural equivalent $[Mo]_{eq}$ ranges from 6.0 to 8.5 wt %, and is defined by the following equation:

$[Mo]_{eq}=[Mo]+[V]/1.5+[Cr]\times 1.25+[Fe]\times 2.5$.

The disclosed titanium alloy can be made in the form of a round rolled bar with a diameter of 8 mm to 31.75 mm (0.315 inches to 1.25 inches) and minimum tensile strength of 165 ksi (1138 MPa) and minimum double shear strength of 100 ksi (689 MPa) in the annealed condition.

The disclosed titanium alloy can be made in the form of a round rolled bar with a diameter of 32 mm to 101.6 mm (1.25 inches to 4 inches) and minimum tensile strength of 160 ksi (1103 MPa) and minimum double shear strength of 95 ksi (655 MPa) in the annealed condition.

Round rolled bars (8 mm to 101.6 mm (0.315 inches to 4.0 inches)) having the disclosed mechanical properties can be achieved using a manufacturing method that includes steps of (1) melting of a titanium alloy ingot that includes 5.5 to 6.5 wt % aluminum (Al); 3.0 to 4.5 wt % vanadium (V); 1.0 to 2.0 wt % molybdenum (Mo); 0.3 to 1.5 wt % iron (Fe); 0.3 to 1.5 wt % chromium (Cr); 0.05 to 0.5 wt % zirconium (Zr); 0.2 to 0.3 wt % oxygen (O); maximum of 0.05 wt % nitrogen (N); maximum of 0.08 wt % carbon (C); maximum of 0.25 wt % silicon (Si); inevitable impurities; and balance titanium, wherein a value of an aluminum structural equivalent $[Al]_{eq}$ ranges from 7.5 to 9.5 wt %, and is defined by the following equation:

$[Al]_{eq}=[Al]+[O]\times 10+[Zr]/6$, and wherein a value of a molybdenum structural equivalent $[Mo]_{eq}$ ranges from 6.0 to 8.5 wt %, and is defined by the following equation:

$$[Mo]_{eq}=[Mo]+[V]/1.5+[Cr]\times1.25+[Fe]\times2.5;$$

(2) conversion of the ingot to a forged billet at beta and/or alpha-beta phase field temperatures; (3) machining of the forged billet; (4) hot rolling at a heating temperature of beta and/or alpha-beta phase field to produce a round stock; and (5) annealing of the round stock at a temperature of 550° C. to 788° C. (1022° F. to 1450° F.) for at least 0.5 hour.

Referring to FIG. 1, one particular method for manufacturing a round rolled bar begins with the step of melting an ingot in a vacuum arc furnace to achieve the following chemical composition: 5.5 to 6.5 wt % aluminum (Al); 3.0 to 4.5 wt % vanadium (V); 1.0 to 2.0 wt % molybdenum (Mo); 0.3 to 1.5 wt % iron (Fe); 0.3 to 1.5 wt % chromium (Cr); 0.05 to 0.5 wt % zirconium (Zr); 0.2 to 0.3 wt % oxygen (O); maximum of 0.05 wt % nitrogen (N); maximum of 0.08 wt % carbon (C); maximum of 0.25 wt % silicon (Si); inevitable impurities; and balance titanium, wherein a value of an aluminum structural equivalent $[Al]_{eq}$ ranges from 7.5 to 9.5 wt %, and is defined by the following equation:

$$[Al]_{Aq}=[Al]+[O]\times10+[Zr]/6, \text{ and}$$

wherein a value of a molybdenum structural equivalent $[Mo]_{eq}$ ranges from 6.0 to 8.5 wt %, and is defined by the following equation:

$$[Mo]_{eq}=[Mo]+[V]/1.5+[Cr]\times1.25+[Fe]\times2.5.$$

Further, the ingot is converted to a forging stock (billet) at temperatures of beta and/or alpha-beta phase field which helps to eliminate the as-cast structure and prepare the metal structure for subsequent rolling, i.e., to produce a billet with the equiaxed macrograin. To completely remove a gas-rich layer and surface defects of hot working origin, the forging stock is machined. Hot rolling of a machined billet is carried out at a heating temperature of beta and/or alpha-beta phase field. Subsequent annealing of a rolled billet at a temperature of 550° C. to 788° C. (1022° F. to 1450° F.) for at least 0.5 hour with cooling down to room temperature is performed to obtain a more equilibrium structure and to lower the internal stresses. Machining of rolled billets is done to remove the scale and gas-rich layer.

The disclosed titanium alloy can be made in the form of a round wire with a diameter up to 10 mm (0.394 inches) produced via drawing and having minimum tensile strength of 168 ksi (1158 MPa) and minimum double shear strength of 103 ksi (710 MPa) in the annealed condition.

A wire (up to 10 mm (0.394 inches)) having the disclosed mechanical properties can be achieved using a manufacturing method that includes steps of (1) melting of a titanium alloy ingot that includes 5.5 to 6.5 wt % aluminum (Al); 3.0 to 4.5 wt % vanadium (V); 1.0 to 2.0 wt % molybdenum (Mo); 0.3 to 1.5 wt % iron (Fe); 0.3 to 1.5 wt % chromium (Cr); 0.05 to 0.5 wt % zirconium (Zr); 0.2 to 0.3 wt % oxygen (O); maximum of 0.05 wt % nitrogen (N); maximum of 0.08 wt % carbon (C); maximum of 0.25 wt % silicon (Si); inevitable impurities; and balance titanium, wherein a value of an aluminum structural equivalent $[Al]_{eq}$ ranges from 7.5 to 9.5 wt %, and is defined by the following equation:

$$[Al]_{eq}=[Al]+[O]\times10+[Zr]/6, \text{ and}$$

wherein a value of a molybdenum structural equivalent $[Mo]_{eq}$ ranges from 6.0 to 8.5 wt %, and is defined by the following equation:

$$[Mo]_{eq}=[Mo]+[V]/1.5+[Cr]\times1.25+[Fe]\times2.5;$$

(2) conversion of the ingot to a forged billet at beta and/or alpha-beta phase field temperatures; (3) machining of the forged billet; (4) hot rolling at a heating temperature of beta and/or alpha-beta phase field to produce a round stock; (5) annealing of the round stock at a temperature of 550° C. to 788° C. (1022° F. to 1450° F.) for at least 0.5 hour; (6) drawing to produce a wire; and (7) annealing the wire at a temperature of 550° C. to 788° C. (1022° F. to 1450° F.) for at least 0.5 hour.

Figure 2:
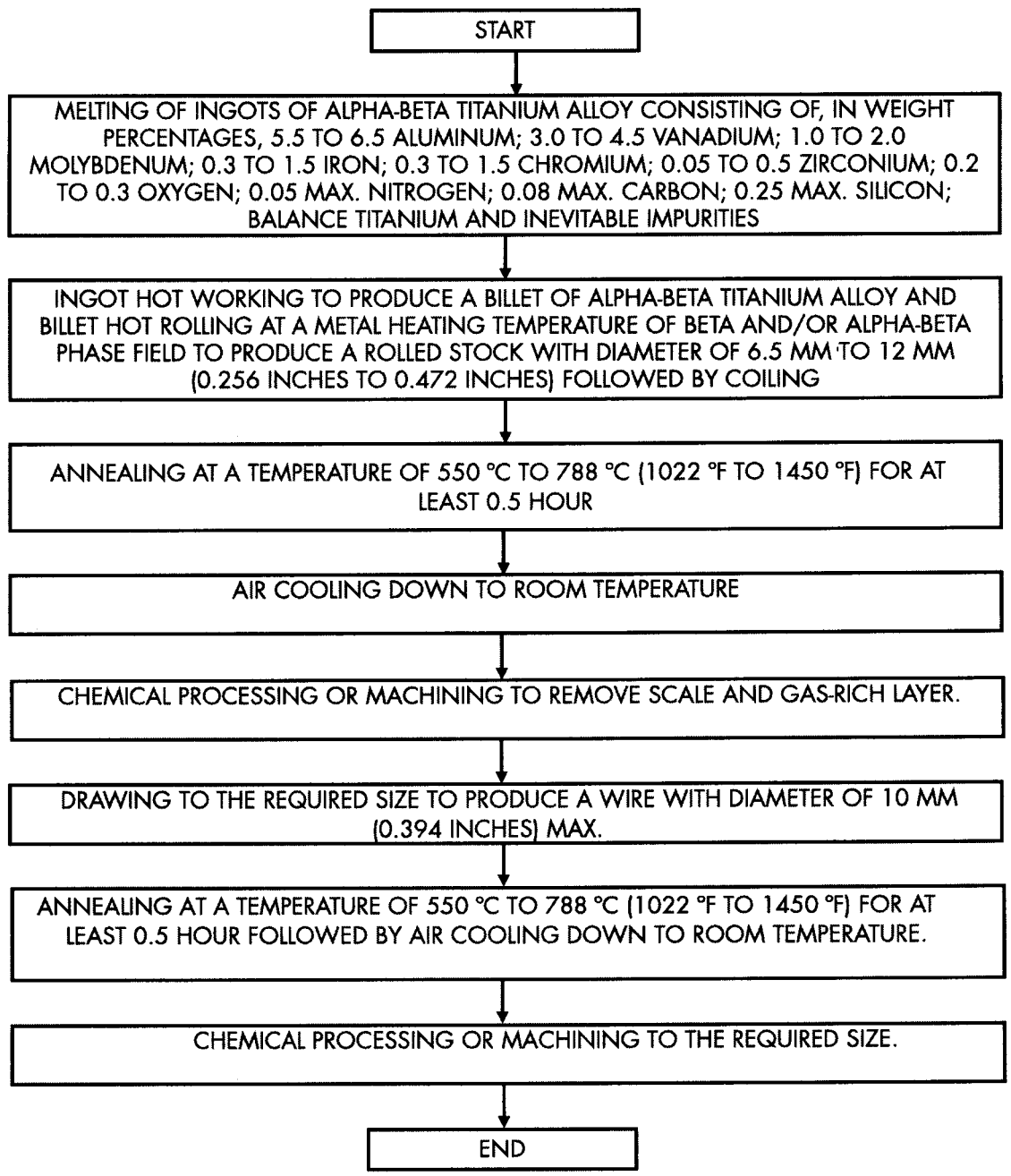
FIG. 2 is a flow diagram depicting one of the disclosed methods for manufacturing an additive manufacturing feedstock.

Referring to FIG. 2, one particular method for manufacturing a wire begins with the step of melting an ingot in a vacuum arc furnace to achieve the following chemical composition: 5.5 to 6.5 wt % aluminum (Al); 3.0 to 4.5 wt % vanadium (V); 1.0 to 2.0 wt % molybdenum (Mo); 0.3 to 1.5 wt % iron (Fe); 0.3 to 1.5 wt % chromium (Cr); 0.05 to 0.5 wt % zirconium (Zr); 0.2 to 0.3 wt % oxygen (O); maximum of 0.05 wt % nitrogen (N); maximum of 0.08 wt % carbon (C); maximum of 0.25 wt % silicon (Si); inevitable impurities; and balance titanium, wherein a value of an aluminum structural equivalent $[Al]_{eq}$ ranges from 7.5 to 9.5 wt %, and is defined by the following equation:

$$[Al]_{eq}=[Al]+[O]\times10+[Zr]/6, \text{ and}$$

wherein a value of a molybdenum structural equivalent $[Mo]_{eq}$ ranges from 6.0 to 8.5 wt %, and is defined by the following equation:

$$[Mo]_{eq}=[Mo]+[V]/1.5+[Cr]\times1.25+[Fe]\times2.5.$$

Further, the method includes manufacture of a forging stock (billet), rolling of a machined billet at a metal heating temperature of beta and/or alpha-beta phase field. Rolling is performed to produce a rolled stock for its subsequent coiling. To remove the internal stresses, coils are annealed at a temperature of 550° C. to 788° C. (1022° F. to 1450° F.), followed by cooling down to room temperature.

To remove the scale and gas-rich layer, the coils are subjected to chemical processing or machining. After that the rolled stock is drawn to produce a wire with diameter up to 10 mm (0.394 inches).

To remove the internal stresses and improve the structural equilibrium, as well as to enhance the plastic properties, the produced wire is annealed at a temperature of 550° C. to 788° C. (1022° F. to 1450° F.) with subsequent air cooling. The annealed wire is either chemically processed or machined to the required size.

The disclosed wire may be used as an additive manufacturing feedstock. Therefore, a part (e.g., a component of an aircraft or the like) can be manufactured by additively manufacturing the part using the disclosed wire as the additive manufacturing feedstock. For example, the disclosed wire can be supplied to a three-dimensional printer, and the three-dimensional printer can be supplied with instructions for printing a net-shape (or near net-shape) part using the disclosed wire.

Wire having a nominal diameter of at most 10 mm (0.394 inches) is disclosed, and may be used for additive manufacturing. In one expression, the disclosed wire may have a nominal diameter of at most about 3.175 mm (0.125 inches). In another expression, the disclosed wire may have a nominal diameter between about 0.127 mm (0.005 inches) and about 3.175 mm (0.125 inches). In another expression, the disclosed wire may have a nominal diameter between about 0.127 mm (0.005 inches) and about 3 mm (0.118 inches). In another expression, the disclosed wire may have a nominal diameter between about 1.27 mm (0.050 inches) and about 1.778 mm (0.070 inches). In yet another expression, the disclosed wire may have a nominal diameter of about 1.524 mm (0.060 inches).

The disclosed titanium alloy can be made in the form of a powder (in powder form). For example, the disclosed titanium alloy can be made in the form of a spheroidized powder (in spheroidized powder form).

The disclosed powder may be used as an additive manufacturing feedstock. Therefore, a part (e.g., a component of an aircraft or the like) can be manufactured by additively manufacturing the part using the disclosed powder as the additive manufacturing feedstock. For example, the disclosed powder can be supplied to a three-dimensional printer, and the three-dimensional printer can be supplied with instructions for printing a net-shape (or near net-shape) part using the disclosed powder.

An additive manufacturing feedstock in powder form can be manufactured by powderizing a titanium alloy having the disclosed composition. While specific, non-limiting examples suitable powderizing techniques are disclosed, those skilled in the art will appreciate that various powderizing techniques may be used without departing from the scope of the present disclosure.

Figure 3:
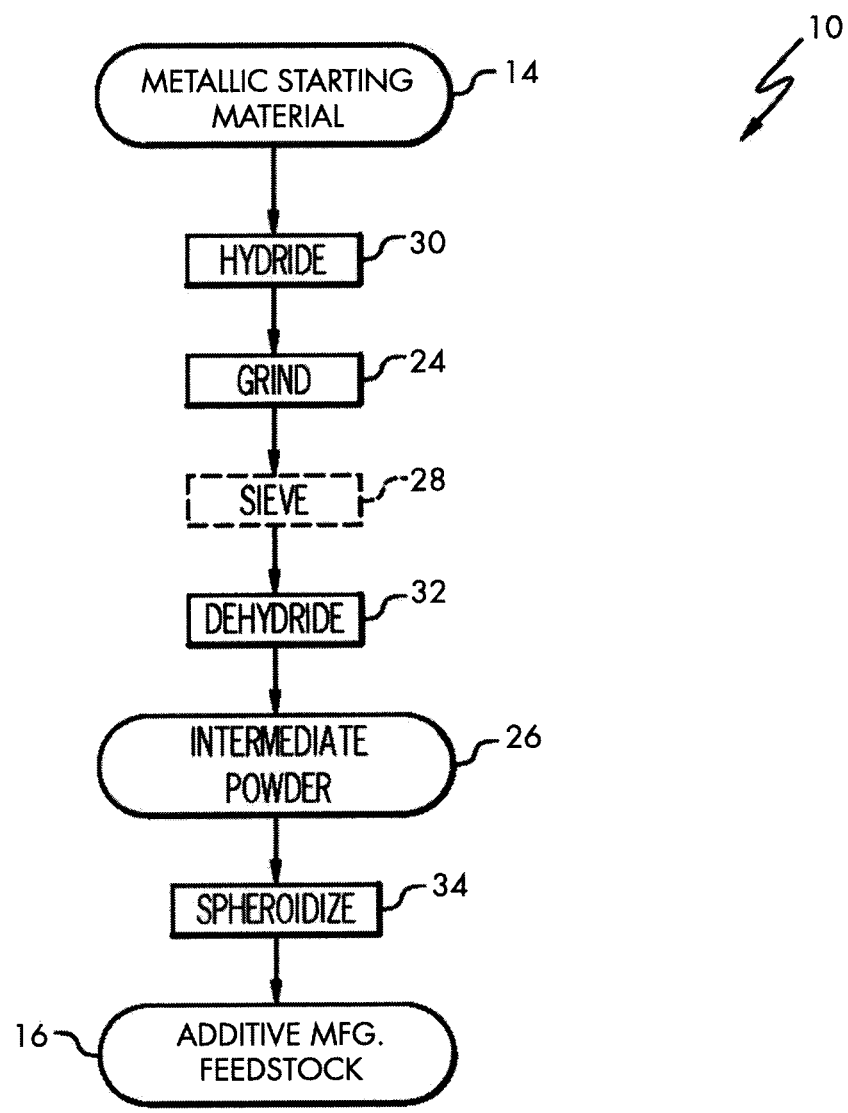
FIG. 3 is a flow diagram depicting another of the disclosed methods for manufacturing an additive manufacturing feedstock.

Referring to FIG. 3, an additive manufacturing feedstock 16 in powder form can be manufactured from a metallic starting material 14 using a grind-and-spheroidize process 10. The metallic starting material 14 can be any metallic material having the disclosed titanium alloy composition. For example, the metallic starting material 14 can be an ingot, one or more of the round rolled bars disclosed herein, unused/unwanted parts, swarf or the like.

The disclosed grind-and-spheroidize process 10 for manufacturing an additive manufacturing feedstock 16 in powder form may include the step of grinding 24 the metallic starting material 14 to yield an intermediate powder 26. The grinding 24 can convert the metallic starting material 14 into a powder (the intermediate powder 26) having the desired physical properties (e.g., desired average particle size and distribution), which can depend on numerous factors, such as the intended use of the additive manufacturing feedstock 16.

Various techniques for grinding 24 can be used without departing from the scope of the present disclosure. As one non-limiting example, the grinding 24 can be performed in a planetary mill. As another non-limiting example, the grinding 24 can be performed in a roller mill. As yet another non-limiting example, the grinding 24 can be performed in a ball mill. Planetary mills, roller mills and ball mills are capable of producing an intermediate powder 26 having a particle size distribution suitable for, among other things, additive manufacturing.

The grinding 24 can be performed such that the intermediate powder 26 has a particle size distribution that facilitates tight packing. In one expression, the grinding 24 can be performed such that the intermediate powder 26 has an average particle size between about 5 µm and about 500 µm. In another expression, the grinding 24 can be performed such that the intermediate powder 26 has an average particle size between about 10 µm and about 100 µm.

Optionally, the powder produced by the grinding 24 can be sieved 28 to obtain a desired particle size distribution. For example, sieving 28 can yield an intermediate powder 26 having a narrower particle size distribution, which can increase the density of, and improve the surface quality and mechanical properties of, resulting additively manufactured parts/articles. In one expression, sieving 28 can yield an intermediate powder 26 having a particle size distribution wherein at least 40 percent of the particles of the intermediate powder 26 have a particle size within (+/−) 20 percent of the average particle size. In another expression, sieving 28 can yield an intermediate powder 26 having a particle size distribution wherein at least 60 percent of the particles of the intermediate powder 26 have a particle size within (+/−) 20 percent of the average particle size. In yet another expression, sieving 28 can yield an intermediate powder 26 having a particle size distribution wherein at least 80 percent of the particles of the intermediate powder 26 have a particle size within (+/−) 20 percent of the average particle size.

Optionally, the metallic starting material 14 can be hydrided in a hydriding step 30 prior to grinding 24, thereby rendering the metallic starting material 14 more brittle and susceptible to grinding 24. For example, the metallic starting material 14 can be hydrided in a hydriding step 30 by heating the metallic starting material 14 in the presence of hydrogen gas (e.g., in a tube furnace) to an elevated temperature (e.g., 600-700° C.) for a period of time (e.g., 24 hours).

When a hydriding step 30 is performed, then a corresponding dehydriding step 32 can also be performed. The dehydriding 32 can be performed after grinding 24, and either before or after the optional sieving 28, thereby yielding the intermediate powder 26. For example, dehydriding 32 can be performed under vacuum at an elevated temperature (e.g., 550-700° C.) for a period of time (e.g., 72 hours).

Still referring to FIG. 3, the disclosed grind-and-spheroidize process 10 can further include spheroidizing 34 the intermediate powder 26 to yield the additive manufacturing feedstock 16 in powder form. Therefore, the particles of the additive manufacturing feedstock 16 in powder form may be substantially spherical. As used herein, "spherical" does not require perfect sphericity, but rather means "substantially spherical."

Various techniques can be used for spheroidizing 34 the intermediate powder 26 without departing from the scope of the present disclosure. In one particular implementation, spheroidizing 34 can include introducing the particles of the intermediate powder 26 to a plasma, such as an induction plasma, to quickly heat and melt the particles, followed by cooling. For example, a TEKSPHERO 200™, which is commercially available from Tekna Plasma Systems Inc. of Quebec, Canada, can be used for spheroidizing 34 the intermediate powder 26 using an induction plasma.

Figure 4:
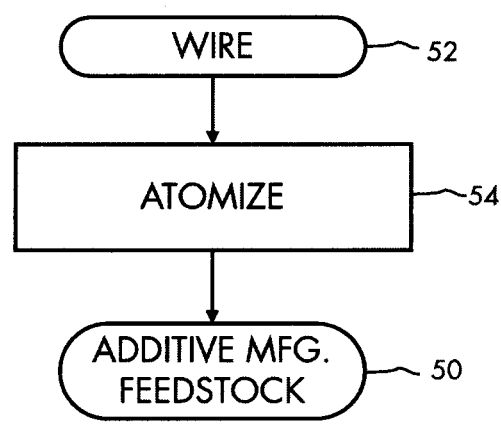
FIG. 4 is a flow diagram depicting yet another one of the disclosed methods for manufacturing an additive manufacturing feedstock.

Referring to FIG. 4, an additive manufacturing feedstock 50 in powder form can be manufactured from wire 52 having the disclosed titanium alloy composition by atomizing 54 the wire 52 to yield the additive manufacturing feedstock 50. In one particular implementation, the atomizing 54 of the wire 52 may include plasma atomization, wherein the wire 52 is fed through a plasma to yield the additive manufacturing feedstock 50 in powder form. Various other atomizing techniques are contemplated, and may be used without departing from the scope of the present disclosure.

While various powderizing techniques are disclosed for obtaining a powder having the disclosed titanium alloy composition, it is also contemplated that alloying may occur at the powder level. In other words, a powder (or a consolidated mass formed from such powder) may be manufactured by admixing various powder compositions to yield a powder having the disclosed titanium alloy composition.

The disclosed titanium alloy can be used for additive manufacturing, such as in powder form, in wire form or other suitable form, with a high level of strength properties and double shear strength while maintaining a high level of plastic properties.

The disclosed titanium alloy demonstrates a combination of high processing and structural properties, which is achieved by optimal selection of alloying elements, their ratios in titanium alloy, and also by optimized parameters of thermomechanical treatment.

The disclosed titanium alloy is made of an alpha-beta titanium alloy containing alpha stabilizers, neutral strengtheners, and beta stabilizers.

A group of alpha stabilizers is formed of the elements such as aluminum and oxygen. The introduction of alpha stabilizers into titanium alloys expands the range of titanium solid solutions, reduces the density and improves the modulus of elasticity of the alloy. Aluminum is the most efficient strengthener which increases strength-to-weight ratio of the alloy, while improving the strength and high temperature behavior of titanium. When aluminum concentration in the alloy is less than 5.5 wt %, the required strength is not achieved, while concentration exceeding 6.5% leads to an undesirable decrease in plasticity with a significant increase of beta transus temperature (BTT). Oxygen increases the temperature of titanium allotropic transformation. Presence of oxygen in the range of 0.2 wt % to 0.3 wt % increases the strength without plasticity deterioration. Presence of nitrogen in the alloy in concentrations not exceeding 0.05 wt % and carbon in concentrations not exceeding 0.08 wt % has no significant effect on the decrease in plasticity at room temperature.

Neutral strengtheners in the disclosed titanium alloy include zirconium. Zirconium forms a wide range of solid solutions with alpha titanium, has similar a melting point and density, and improves corrosion resistance. A concentration of zirconium taken in the range of 0.05 wt % to 0.5 wt % enhances the tendency of strength increase due to the improved strength of alpha phase and effective influence on the maintenance of metastable state when cooling a stock of a heavier cross section.

A group of beta stabilizers disclosed herein consists of isomorphous beta stabilizers and eutectoid beta stabilizers.

The chemistry of the disclosed titanium alloy consists of isomorphous beta stabilizers, such as vanadium and molybdenum. A concentration of vanadium in the range of 3.0 wt % to 4.5 wt % ensures stabilization of beta phase, i.e., it hinders formation of alpha2 superstructure in alpha phase and contributes to the improvement of both strength and plastic properties. A concentration of molybdenum in the range of 1.0 wt % to 2.0 wt % ensures its complete solubility in alpha phase, which results in a high level of strength properties without deterioration of plastic properties. When molybdenum concentration exceeds 2.0 wt %, the alloy specific gravity increases, while the alloy strength-to-weight ratio and plastic properties decrease.

The disclosed titanium alloy chemistry is also presented by eutectoid beta stabilizers (Cr, Fe, Si).

Addition of iron in the range of 0.3 wt % to 1.5 wt % increases the volume fraction of beta phase, reducing the strain resistance during hot working of the alloy, which helps to prevent defects of hot working origin. The concentration of iron over 1.5 wt % leads to segregation processes with formation of beta flecks during the alloy melting and solidification, which lead to inhomogeneity of structure and mechanical properties, as well as to deterioration of corrosion resistance.

Chromium concentration is established in the range of 0.3 wt % to 1.5 wt % due to its capability to strengthen titanium alloys well and act as a strong beta stabilizer. However, there is a high probability of forming embrittling intermetallics at long isothermal exposures and chemical inhomogeneities during ingot melting when alloying with chromium exceeds the established maximum limit.

The concentration of silicon is accepted at 0.25 wt % maximum, since silicon in the specified limits completely dissolves in alpha phase, providing for strengthening of alpha solid solution and formation of a small amount of beta phase in the alloy. Moreover, addition of silicon to the alloy increases its high temperature stability. The concentrations of silicon exceeding the above limit result in formation of silicides, which lead to reduction in creep strength and material cracking.

The disclosed titanium alloy is based on the possibility of separating the effects of titanium alloy strengthening via alloying with alpha stabilizers and neutral strengtheners and addition of beta stabilizers. This possibility is justified by the following considerations. Elements equivalent to aluminum strengthen titanium alloys mainly as a result of solution strengthening, while beta stabilizers strengthen titanium alloys mainly as a result of the increased amount of stronger beta phase. Therefore, in order to stabilize strength properties, there were marginal concentrations of alloying elements established. For this purpose, there was a mechanism defined for control of their ratios within the ranges of the claimed composition.

Structural aluminum ($[Al]_{eq}$) and molybdenum ($[Mo]_{eq}$) equivalents governed by economic, strength and processing criteria were calculated for the alloy used to make a fastener stock.

The structural aluminum equivalent $[Al]_{eq}$ is set in the range of 7.5 to 9.5. This limitation is explained by the fact that the value of $[Al]_{eq}$ below 7.5 does not ensure the required consistency of mechanical properties, and the value of $[Al]_{eq}$ over 9.5 leads to the increase in solid solution strengthening which deteriorates plastic behavior and creates prerequisites for cracking during hot working.

The value of the structural molybdenum equivalent $[Mo]_{eq}$ is taken in the range of 6.0 to 8.5, which ensures stabilization of the required amount of beta phase, phase changes upon thermal exposure to obtain a high level of strength properties of the alloy.

$[Al]_{eq}$ and $[Mo]_{eq}$ disclosed herein are the baseline categories that are established, controlled and that efficiently manage the manufacturing process to ensure a high quality part precisely meeting the customer requirements for structural and processing characteristics. The principles disclosed herein enable make-up of the deficiency in more expensive chemical elements by equivalent amounts of available less expensive alloying elements within the assigned strength equivalents and alloy chemical composition, including those alloying elements that are contained in certain amounts in the incorporated scrap. At the same time, the cost of the alloy can be reduced by 30 percent with stable preservation of high structural and operational properties of a part.

EXAMPLES

Example 1

To test industrial applicability, an ingot with the chemical composition shown in Table 1 was melted. The beta transus temperature was 998° C. (1828° F.).

TABLE 1

| Sampling area | Concentration of elements, wt. % | | | | | | | | | | Values of structural equivalents |
|---|---|---|---|---|---|---|---|---|---|---|---|
| | Al | V | Mo | Fe | Cr | Zr | O | N | C | Si | |
| Ingot top | 5.96 | 3.72 | 1.64 | 0.77 | 0.69 | 0.1 | 0.25 | 0.002 | 0.039 | 0.022 | Balance-titanium and inevitable impurities | [Al]eq = 8.5 [Mo]eq = 7.0 |
| Ingot bottom | 6.01 | 3.8 | 1.6 | 0.82 | 0.71 | 0.1 | 0.24 | 0.002 | 0.047 | 0.017 | | [Al]eq = 8.4 [Mo]eq = 7.1 |

Figure 5:
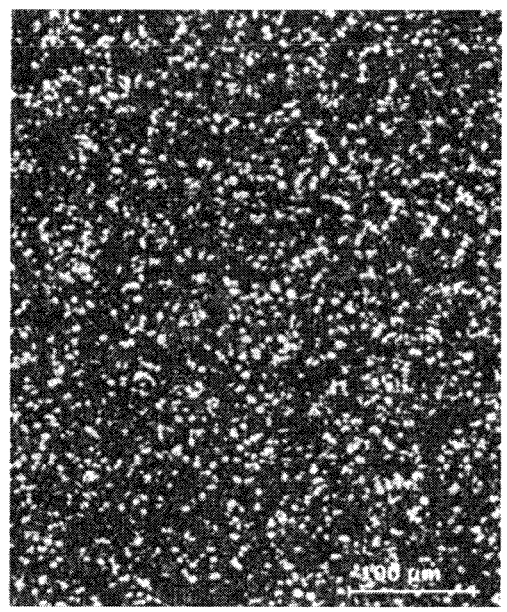
FIG. 5 depicts the microstructure of a bar stock (diameter=12.7 mm (0.5 inches)) made of the disclosed titanium alloy.

The ingot was converted to forged billets at temperatures of beta and alpha-beta phase fields. Billets were rolled to produce a bar stock with diameter of 12.7 mm (0.5 inches) at a temperature of final rolling operation of 915° C. (1679° F.). The rolled bar stock was annealed at a temperature of 600° C. (1112° F.) for 60 minutes with air cooling down to room temperature. After that, mechanical tests and structure examination were performed. The results of mechanical tests of the bar stock after heat treatment are presented in Table 2 and the microstructure of the heat treated bar stock at magnification 200× is shown in FIG. 5.

TABLE 2

| | Tensile properties | | | | |
|---|---|---|---|---|---|
| Specimen number | Yield strength, ksi (MPa) | Ultimate tensile strength, ksi (MPa) | Elongation, % | Reduction of area, % | Double shear strength, ksi (MPa) |
| 1 | 168.3 (1160) | 179.2 (1236) | 15.3 | 56.6 | 114.2 (787) |
| 2 | 170.7 (1177) | 181.8 (1254) | 16.3 | 59 | 113.5 (783) |

Example 2

To produce a bar stock with diameter of 101.6 mm (4 inches), the ingot with the chemical composition shown in Table 3 was melted. The alloy beta transus temperature (BTT) determined by metallographic method was 988° C. (1810° F.).

Figure 6:
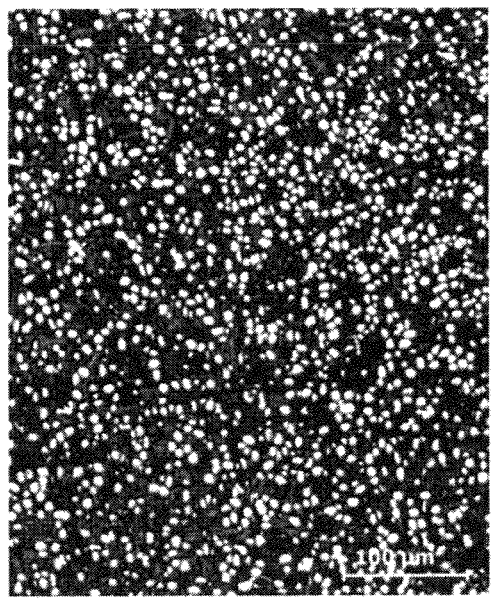
FIG. 6 depicts the microstructure of a bar stock (diameter=101.6 mm (4 inches)) made of the disclosed titanium alloy.

The ingot was converted to forged billets at temperatures of beta and alpha-beta phase fields. Billets were rolled to produce a bar stock with diameter of 101.6 mm (4 inches) at a temperature of 918° C. (1685° F.). The test coupons of the rolled bar stock with diameter of 101.6 mm (4 inches) and length of 101.6 mm (4 inches) were annealed at a temperature of 600° C. (1112° F.) for 60 minutes. After that, mechanical tests in longitudinal direction and structure examination were performed. The results of mechanical tests of the bar stock after heat treatment are presented in Table 4 and the microstructure of the bar stock at magnification 200× is shown in FIG. 6.

TABLE 4

| | Tensile properties | | | | |
|---|---|---|---|---|---|
| Specimen number | Yield strength, ksi (MPa) | Ultimate tensile strength, ksi (MPa) | Elongation, % | Reduction of area, % | Double shear strength, ksi (MPa) |
| 1 | 149.1 (1028) | 163.3 (1126) | 15.3 | 48.3 | 104.6 (721) |
| 2 | 149.5 (1031) | 162.5 (1121) | 16 | 52.2 | 106.6 (735) |

Example 3

To produce a wire with diameter of 5.18 mm (0.204 inches), the ingot with the chemical composition shown in Table 5 was melted. The alloy beta transus temperature (BTT) determined by metallographic method was 988° C. (1810° F.).

TABLE 3

| Sampling area | Concentration of elements, wt. % | | | | | | | | | | Values of structural equivalents |
|---|---|---|---|---|---|---|---|---|---|---|---|
| | Al | V | Mo | Fe | Cr | Zr | O | N | C | Si | |
| Ingot top | 5.74 | 3.84 | 1.6 | 0.72 | 0.69 | 0.1 | 0.26 | 0.006 | 0.04 | 0.018 | Balance-titanium and inevitable impurities | [Al]eq = 8.36 [Mo]eq = 6.82 |
| Ingot bottom | 5.74 | 3.84 | 1.59 | 0.72 | 0.7 | 0.11 | 0.25 | 0.006 | 0.038 | 0.019 | | [Al]eq = 8.26 [Mo]eq = 6.83 |

TABLE 5

| Sampling area | Concentration of elements, wt. % | | | | | | | | | | Values of structural equivalents |
|---|---|---|---|---|---|---|---|---|---|---|---|
| | Al | V | Mo | Fe | Cr | Zr | O | N | C | Si | |
| Ingot top | 5.74 | 3.84 | 1.6 | 0.72 | 0.69 | 0.1 | 0.26 | 0.006 | 0.04 | 0.018 | Balance-titanium and inevitable impurities | [Al]eq = 8.36 [Mo]eq = 6.82 |
| Ingot bottom | 5.74 | 3.84 | 1.59 | 0.72 | 0.7 | 0.11 | 0.25 | 0.006 | 0.038 | 0.019 | | [Al]eq = 8.26 [Mo]eq = 6.83 |

Figure 7:
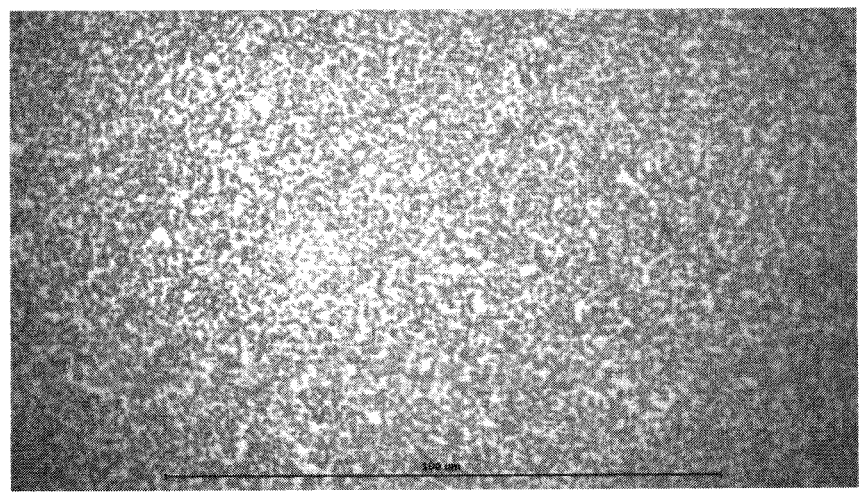
FIG. 7 depicts the microstructure of a wire (diameter=5.18 mm (0.204 inches)) made of the disclosed titanium alloy.

The ingot was converted to forged billets at temperatures of beta and alpha-beta phase fields. Billets were rolled to produce a stock with diameter of 101.6 mm (4 inches) at a temperature of 918° C. (1685° F.). The rolled stock with diameter of 101.6 mm (4 inches) was rolled to a stock with diameter of 7.92 mm (0.312 inches) with the end of hot working in alpha-beta phase field. The rolled stock with diameter of 7.92 mm (0.312 inches) was degassed in a vacuum furnace and then drawn via several stages to produce a wire with diameter of 6.07 mm (0.239 inches). The wire was annealed under the following conditions: heating to 705° C. (1300° F.), soaking for 1 hour, air cooling. Wire grinding and polishing were followed by blasting and pickling. After that, the wire was lubed and sized to diameter of 5.18 mm (0.204 inches). The results of mechanical tests of the wire with diameter of 5.18 mm (0.204 inches) after annealing are presented in Table 6. The microstructure of the wire at magnification 800× is shown in FIG. 7.

TABLE 6

| | Tensile properties | | | | |
|---|---|---|---|---|---|
| Specimen number | Yield strength, ksi (MPa) | Ultimate tensile strength, ksi (MPa) | Elongation, % | Reduction of area, % | Double shear strength, ksi (MPa) |
| 1 | 164 (1131) | 190 (1310) | 21 | 58 | 111 (765) |
| 2 | 160 (1103) | 188 (1296) | 18 | 57 | 110 (758) |

Examples 4-21 and Comparative Examples C1-C9

The disclosed titanium alloy was evaluated for use in additive manufacturing. Test parts having a T-shaped structure were additively manufactured using the disclosed additive manufacturing feedstock. Ten of the test parts (Examples 4-13) had the chemical composition shown in Table 7, while eight of the test parts (Examples 14-21) had the chemical composition shown in Table 8. All eighteen test parts (Examples 4-21) were annealed at 1375° F. (746° C.) for two hours.

TABLE 7

| Examples 4-13 | Concentration of elements, wt. % | | | | | | | | |
|---|---|---|---|---|---|---|---|---|---|
| | Al | V | Fe | Mo | Cr | C | Zr | O | N |
| Target | 5.80 | 4.00 | 0.80 | 1.50 | 0.70 | 0.040 | 0.100 | 0.25 | |
| Bottom | 5.82 | 3.92 | 0.81 | 1.65 | 0.72 | 0.044 | 0.100 | 0.25 | 0.001 |
| Top | 5.86 | 3.93 | 0.75 | 1.65 | 0.68 | 0.051 | 0.100 | 0.23 | 0.001 |

TABLE 8

| Examples 14-21 | Concentration of elements, wt. % | | | | | | | | |
|---|---|---|---|---|---|---|---|---|---|
| | Al | V | Fe | Mo | Cr | C | Zr | O | N |
| Target | 6.00 | 3.80 | 0.80 | 1.50 | 0.70 | 0.040 | 0.100 | 0.25 | |
| Bottom | 5.96 | 3.72 | 0.77 | 1.64 | 0.69 | 0.039 | 0.100 | 0.25 | 0.002 |
| Top | 6.01 | 3.80 | 0.82 | 1.60 | 0.71 | 0.047 | 0.100 | 0.24 | 0.002 |

For comparison, the same T-shaped test parts were additively manufactured using standard Ti-6Al-4V (Comparative Examples C1-C9). The Ti-6Al-4V test parts underwent heat treatment such that they were in solution treated and aged (STA) condition.

Tensile coupons were extracted from the test parts and mechanical tests were performed in accordance with ASTM E8. The results are presented in Table 9.

TABLE 9

| Ex. | Temp. ° F. | Stressed Dimension in | 0.2% Yield | | Ultimate | | Elong 4D/4W | | R of A | |
|---|---|---|---|---|---|---|---|---|---|---|
| | | | lbs | ksi | lbs | ksi | in | % | in | % |
| 4 | RT | 0.250 (d) | 7416 | 151.1 | 7954 | 162 | 1.115 | 11.5 | 0.215 | 26 |
| 5 | RT | 0.251 (d) | 7442 | 150.4 | 8045 | 162.6 | 1.103 | 10.3 | 0.233 | 13.8 |
| 6 | RT | 0.251 (d) | 7483 | 151.2 | 8003 | 161.7 | 1.098 | 9.8 | 0.223 | 21.1 |
| 7 | RT | 0.250 (d) | 7474 | 152.3 | 8031 | 163.6 | 1.122 | 12.2 | 0.22 | 22.6 |
| 8 | RT | 0.251 (d) | 7507 | 151.7 | 8009 | 161.9 | 1.095 | 9.5 | 0.225 | 19.6 |
| 9 | RT | 0.251 (d) | 7343 | 148.4 | 7880 | 159.3 | 1.093 | 9.3 | 0.224 | 20.4 |
| 10 | RT | 0.250 (d) | 7407 | 150.9 | 7758 | 158 | 1.07 | 7 | 0.236 | 10.9 |
| 11 | RT | 0.251 (d) | 7613 | 153.9 | 7862 | 158.9 | 1.047 | 4.7 | 0.24 | 8.6 |
| 12 | RT | 0.251 (d) | 8228 | 166.3 | 8367 | 169.1 | 1.035 | 3.5 | 0.246 | 3.9 |
| 13 | RT | 0.251 (d) | 7670 | 155 | 8125 | 164.2 | 1.07 | 7 | 0.24 | 8.6 |
| 14 | RT | 0.251 (d) | 7685 | 155.3 | 8251 | 166.8 | 1.101 | 10.1 | 0.233 | 13.8 |
| 15 | RT | 0.251 (d) | 7715 | 155.9 | 8241 | 166.5 | 1.139 | 13.9 | 0.213 | 28 |
| 16 | RT | 0.250 (d) | 7558 | 154 | 8106 | 165.1 | 1.141 | 14.1 | 0.201 | 35.4 |

TABLE 9-continued

| Ex. | Temp. °F. | Stressed Dimension in | 0.2% Yield lbs | 0.2% Yield ksi | Ultimate lbs | Ultimate ksi | Elong 4D/4W in | Elong 4D/4W % | R of A in | R of A % |
|---|---|---|---|---|---|---|---|---|---|---|
| 17 | RT | 0.251 (d) | 7623 | 154.1 | 8217 | 166.1 | 1.107 | 10.7 | 0.232 | 14.6 |
| 18 | RT | 0.250 (d) | 7574 | 154.3 | 8136 | 165.7 | 1.053 | 5.3 | 0.24 | 7.8 |
| 19 | RT | 0.250 (d) | 7669 | 156.2 | 7731 | 157.5 | 1.013 | 1.3 | 0.247 | 2.4 |
| 20 | RT | 0.250 (d) | 7556 | 153.9 | 7813 | 159.2 | 1.027 | 2.7 | 0.243 | 5.5 |
| 21 | RT | 0.251 (d) | 8600 | 173.8 | 8712 | 176.1 | 1.02 | 2 | 0.242 | 7 |
| C1 | RT | 0.250 (d) | 6512 | 132.7 | 7052 | 143.7 | 1.119 | 11.9 | 0.207 | 31.4 |
| C2 | RT | 0.251 (d) | 6449 | 130.3 | 6913 | 139.7 | 1.127 | 12.7 | 0.203 | 34.6 |
| C3 | RT | 0.250 (d) | 6461 | 131.6 | 6934 | 141.3 | 1.135 | 13.5 | 0.213 | 27.4 |
| C4 | RT | 0.251 (d) | 6517 | 131.7 | 6999 | 141.4 | 1.12 | 12 | 0.218 | 24.6 |
| C5 | RT | 0.251 (d) | 6283 | 127 | 6814 | 137.7 | 1.102 | 10.2 | 0.225 | 19.6 |
| C6 | RT | 0.250 (d) | 6446 | 131.3 | 6856 | 139.7 | 1.162 | 16.2 | 0.205 | 32.8 |
| C7 | RT | 0.250 (d) | 6418 | 130.7 | 6964 | 141.9 | 1.045 | 4.5 | 0.238 | 9.4 |
| C8 | RT | 0.251 (d) | 6275 | 126.8 | 6821 | 137.9 | 1.045 | 4.5 | 0.235 | 12.3 |
| C9 | RT | 0.251 (d) | 6636 | 134.1 | 7239 | 146.3 | 1.078 | 7.8 | 0.235 | 12.3 |

The annealed titanium alloy performed well, as comparted to standard solution treated and aged (STA) Ti-6A1-4V. It is noted that Examples 11-14,17-20, C6 and C7 exhibited a fractured outer-quarter.

Figure 8:
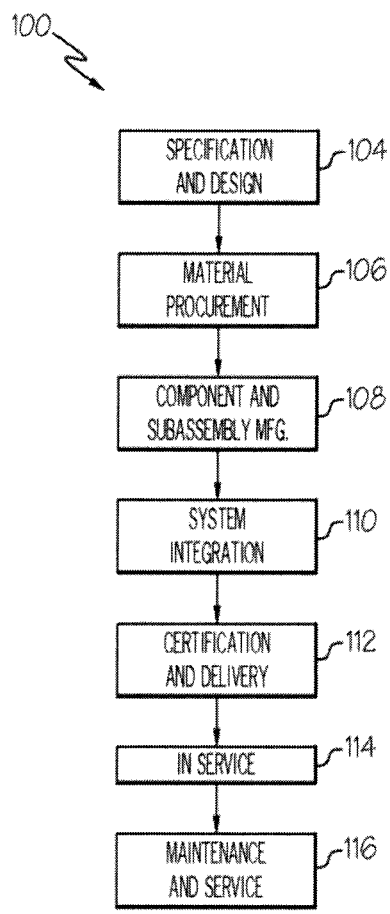
FIG. 8 is a flow diagram of an aircraft manufacturing and service methodology.
Figure 9:
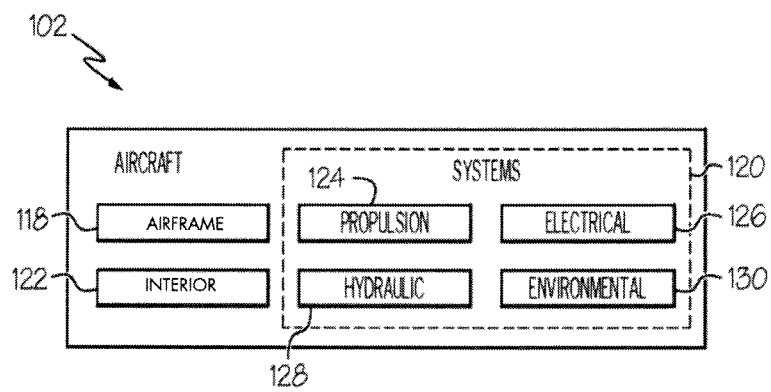
FIG. 9 is a block diagram of an aircraft.

Examples of the disclosure may be described in the context of an aircraft manufacturing and service method 100, as shown in FIG. 8, and an aircraft 102, as shown in FIG. 9. During pre-production, the aircraft manufacturing and service method 100 may include specification and design 104 of the aircraft 102 and material procurement 106. During production, component/subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116, which may also include modification, reconfiguration, refurbishment and the like.

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 9, the aircraft 102 produced by example method 100 may include an airframe 118 with a plurality of systems 120 and an interior 122. Examples of the plurality of systems 120 may include one or more of a propulsion system 124, an electrical system 126, a hydraulic system 128, and an environmental system 130. Any number of other systems may be included.

The disclosed high-strength titanium alloy may be employed during any one or more of the stages of the aircraft manufacturing and service method 100. As one example, components or subassemblies corresponding to component/subassembly manufacturing 108, system integration 110, and or maintenance and service 116 may be fabricated or manufactured using the disclosed high-strength titanium alloy. As another example, the airframe 118 may be constructed using the disclosed high-strength titanium alloy. Also, one or more apparatus examples, method examples, or a combination thereof may be utilized during component/subassembly manufacturing 108 and/or system integration 110, for example, by substantially expediting assembly of or reducing the cost of an aircraft 102, such as the airframe 118 and/or the interior 122. Similarly, one or more of system examples, method examples, or a combination thereof may be utilized while the aircraft 102 is in service, for example and without limitation, to maintenance and service 116.

The disclosed high-strength titanium alloy is described in the context of an aircraft; however, one of ordinary skill in the art will readily recognize that the disclosed high-strength titanium alloy may be utilized for a variety of applications. For example, the disclosed high-strength titanium alloy may be implemented in various types of vehicle including, for example, helicopters, passenger ships, automobiles, marine products (boat, motors, etc.) and the like. Various non-vehicle applications, such as medical applications, are also contemplated.

Although various aspects of the disclosed high-strength titanium alloy for additive manufacturing have been shown and described, modifications may occur to those skilled in the art upon reading the specification. The present application includes such modifications and is limited only by the scope of the claims.

What is claimed is:

1. A component of an aircraft comprising a titanium alloy, the titanium alloy comprising:
   5.5 to 6.5 wt % aluminum;
   3.0 to 4.5 wt % vanadium;
   1.0 to 2.0 wt % molybdenum;
   0.3 to 1.5 wt % iron;
   0.3 to 0.7 wt % chromium;
   0.05 to 0.5 wt % zirconium;
   0.2 to 0.3 wt % oxygen;
   maximum of 0.05 wt % nitrogen;
   maximum of 0.08 wt % carbon;
   maximum of 0.25 wt % silicon; and
   balance titanium,
   wherein a value of an aluminum structural equivalent $[Al]_{eq}$ ranges from 7.5 to 9.5 wt %, and is defined by the following equation:

$$[Al]_{eq}=[Al]+[O]\times10+[Zr]/6,$$

wherein a value of a molybdenum structural equivalent $[Mo]_{eq}$ ranges from 6.0 to 8.5 wt %, and is defined by the following equation:

$$[Mo]_{eq}=[Mo]+[V]/1.5+[Cr]\times1.25+[Fe]\times2.5, \text{ and}$$

wherein the component has a microstructure formed by additive manufacturing.

2. The component of claim 1 having an ultimate tensile strength in an annealed condition of at least 160 ksi (1103 MPa).

3. The component of claim 1 having an ultimate tensile strength in an annealed condition of at least 165 ksi (1138 MPa).

4. The component of claim 1 having an ultimate tensile strength in an annealed condition of at least 168 ksi (1158 MPa).

5. The component of claim 1 having a double shear strength in an annealed condition of at least 95 ksi (655 MPa).

6. The component of claim 1 having a double shear strength in an annealed condition of at least 100 ksi (689 MPa).

7. The component of claim 1 having a double shear strength in an annealed condition of at least 103 ksi (710 MPa).

8. The component of claim 1 wherein the chromium content is in a range of 0.3 to 0.6 wt %.

9. The component of claim 1 wherein the zirconium content is in a range of 0.05 to 0.5 wt %.

10. The component of claim 8 wherein the zirconium content is in a range of 0.05 to 0.5 wt %.

11. The component of claim 1 wherein the value of the aluminum structural equivalent $[Al]_{eq}$ ranges from 8.2 to 9.5 wt %.

12. The component of claim 8 wherein the value of the aluminum structural equivalent $[Al]_{eq}$ ranges from 8.2 to 9.5 wt %.

13. The component of claim 9 wherein the value of the aluminum structural equivalent $[Al]_{eq}$ ranges from 8.2 to 9.5 wt %.

14. The component of claim 10 wherein the value of the aluminum structural equivalent $[Al]_{eq}$ ranges from 8.2 to 9.5 wt %.

15. The component of claim 1 wherein the value of the molybdenum structural equivalent $[Mo]_{eq}$ ranges from 6.8 to 8.5 wt %.

16. The component of claim 8 wherein the value of the molybdenum structural equivalent $[Mo]_{eq}$ ranges from 6.8 to 8.5 wt %.

17. The component of claim 9 wherein the value of the molybdenum structural equivalent $[Mo]_{eq}$ ranges from 6.8 to 8.5 wt %.

18. The component of claim 10 wherein the value of the molybdenum structural equivalent $[Mo]_{eq}$ ranges from 6.8 to 8.5 wt %.

19. The component of claim 11 wherein the value of the molybdenum structural equivalent $[Mo]_{eq}$ ranges from 6.8 to 8.5 wt %.

20. The component of claim 12 wherein the value of the molybdenum structural equivalent $[Mo]_{eq}$ ranges from 6.8 to 8.5 wt %.

* * * * *